United States Patent [19]

Brooksbank

[11] Patent Number: 4,654,870
[45] Date of Patent: Mar. 31, 1987

[54] TELEPHONE KEY SYSTEMS AND KEY STATIONS THEREFOR

[75] Inventor: Richard N. Brooksbank, Nottingham, England

[73] Assignee: Plessey Overseas Limited, Ilford, England

[21] Appl. No.: 733,304

[22] Filed: May 13, 1985

[30] Foreign Application Priority Data

May 23, 1984 [GB] United Kingdom ............... 8413208

[51] Int. Cl.⁴ .................................... H04M 19/00
[52] U.S. Cl. .................................. 379/156; 379/387; 379/413
[58] Field of Search ............ 179/99 M, 99 R, 99 LC, 179/16 F, 18 AD

[56] References Cited

U.S. PATENT DOCUMENTS

| | | | |
|---|---|---|---|
| 3,843,845 | 10/1974 | Ridley | 179/99 M |
| 4,081,615 | 3/1978 | Hoehn | 179/99 R |
| 4,173,714 | 11/1979 | Bloch et al. | 179/99 R |
| 4,203,011 | 5/1980 | Coviello | 179/99 M |
| 4,392,024 | 7/1983 | Shinoi et al. | 179/99 R |
| 4,410,767 | 10/1983 | Sekiguchi | 179/99 R |

FOREIGN PATENT DOCUMENTS 1534459 12/1978 United Kingdom .
1536408 12/1978 United Kingdom .
2123188 1/1984 United Kingdom .

*Primary Examiner*—James L. Dwyer
*Attorney, Agent, or Firm*—Fleit, Jacobson, Cohn & Price

[57] ABSTRACT

In a telephone key system including a central branch exchange and a plurality of key stations, each key station includes a switch-mode power supply unit and derives logic circuit drive power by converting unregulated high tension d.c. voltage power from the exchange to regulated low tension logic level voltage. In the preferred arrangement each key station includes WAL II code signalling receive and transmit circuits and burst mode signalling is adopted. The transformers of these circuits are center-tapped for transformer phantom coupling to the switch-mode power supply unit, and are connected to the exchange by a 2-way 4-wire line. The switch-mode power supply unit is preferably of flyback configuration and includes thus a controlled transistor switch, a transformer, a rectifier, and a switch-mode power supply controller to control on/off operation of the switch for voltage regulation.

4 Claims, 7 Drawing Figures

TELEPHONE KEY SYSTEMS AND KEY STATIONS THEREFOR

TECHNICAL FIELD

The present invention relates to telecommunication systems, particularly telephone key systems and key stations therefor.

Telephone key systems are communication systems wherein each subscriber, usually within an office complex can access other subscribers, each having a key station connected to the key system, merely by depression of a single key at his key station rather than by operation of a dial as for a conventional telephone, or by multiple depression of keys as for a digital telephone.

There are a number of problems with such systems especially when long distances must be allowed for between subscribers.

Since each subscriber has a unit, a key station, on which a selection of keys is positioned it is advantageous for the subscriber to know whether or not a chosen party is engaged. It is known to provide an indicator lamp, associated with each key, to indicate the status of each party subscribing to the system. Such lamps require fairly substantial power levels at each key station if they are all lit together. This becomes more difficult to supply remotely by line feed on long lines and it is known therefore to connect each key station to a mains supply.

In addition with longer lines the quality of received speech and data deteriorates until unacceptable error rates are encountered and this therefore sets a practical limit to the distance between key stations.

BACKGROUND ART

A typical telephone key system comprises a central control unit—i.e. a private branch exchange—, and a multiplicity of remote key stations. It is usual to supply power to each key station along communication lines between the branch exchange and each key station. In the conventional system it is usual to derive power from A.C. mains supply by means of a rectifier/regulator incorporated in the branch exchange. High Tension regulated DC voltage—usually 75-50 volts dc is then fed to each station and converted to logic level Low Tension dc voltage by means of a series regulator incorporated in each key station.

In such a system as aforesaid it is a disadvantage that key stations near to the branch exchange see full voltage and dissipate therefore relatively high levels of power. Those key stations distant from the branch exchange see attenuated voltage, and for these substantially less useful power is available. Also, at distance, the speech/data signals are attenuated. This therefore sets a practical limitation on the system and according to particular design restricts the number of extensions, the number of lamps/facilities, and/or the lengths of line between users.

An alternative approach is to equip each station for direct connection to AC mains supply. This, however, requires bulky and expensive components for each station and increases safety hazards, also requiring a costly solution.

DISCLOSURE OF THE INVENTION

The present invention is intended as a remedy to the problems aforesaid.

It is intended to provide a telephone key system which can operate efficiently from a central exchange power supply and which can include relatively long lines between key stations.

According to the present invention there is provided a telephone key system including a central branch exchange and a plurality of key stations wherein each key station includes an individual switch-mode power supply unit connected to the exchange.

Each switch-mode power supply unit adjusts to draw sufficient power from the system and does so efficiently. Since efficient use is made of the available power, longer line lengths can be accomodated.

It is furthermore advantageous to couple each station to the branch exchange by means of 2-way 4-wire lines and to use transformer phantom d.c. pathways.

In the preferred embodiment of this invention data and/or digitised speech is transmitted between key stations using Walsh II digital coding.

In this way, the effective line length is increased.

BRIEF INTRODUCTION OF THE DRAWINGS

In the drawings accompanying this specification:

Figure 1:
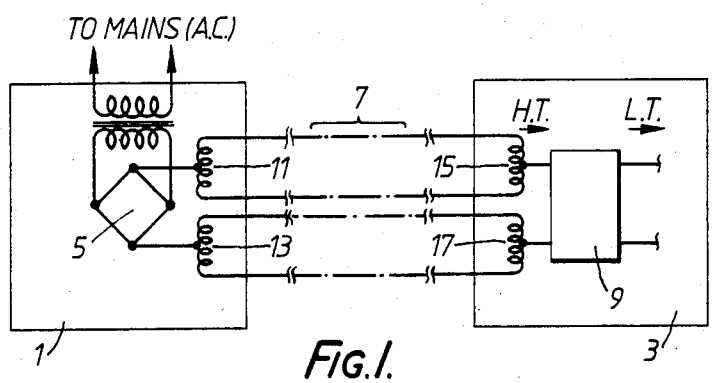
FIG. 1, is a schematic illustration of a telephone key system, a preferred embodiment of the present invention.
Figure 4:
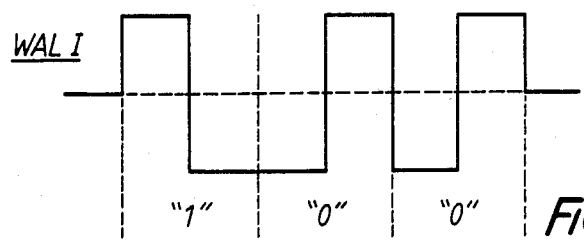
Figure 5:
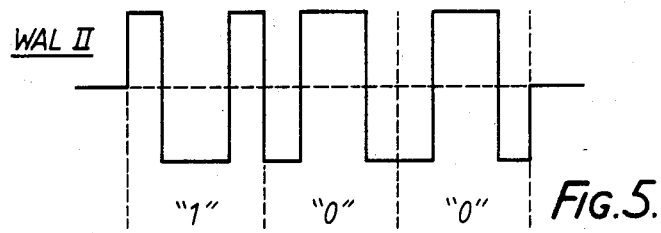
Figure 6:
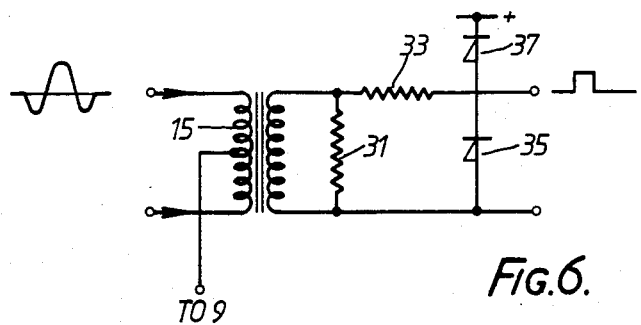
Figure 7:
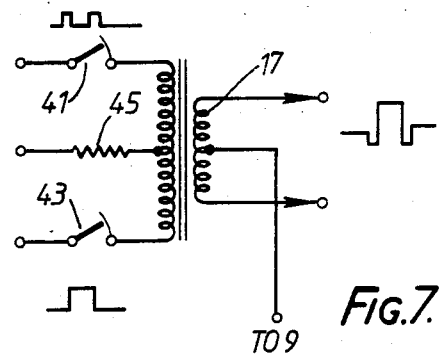

FIGS. 4 and 5 repectively, are waveform representations of Walsh I and Walsh II coded signals that may be utilised in the system illustrated in FIG. 1; and, FIGS. 6 and 7 respectively, are circuit diagrams of a front-end receiver circuit and a terminal transmitter circuit suitable for Walsh II code transmission, for use in the system illustrated in FIG. 1.

DESCRIPTION OF THE PREFERRED EMBODIMENT

A telephone key system is shown in FIG. 1 and comprises a central unit—a branch exchange 1—and a multiplicity of key-stations, one of which, key station 3, is shown in the figure. The central unit 1 includes, inter alia, a bridge rectifier circuit 5 by which means unregulated d.c. power is derived from a connected a.c. mains supply. Unregulated high tension d.c. voltage circa 50 volts, is fed to each key station 3 by means of line circuits including a 2-way 4-wire line 7, as shown.

The d.c. connection between the central control unit 1 and each key station 3, in the preferred arrangement shown, utilises transformer phantom pathways. The d.c. output of the central control unit 1 is connected to the mid-points of two transformer windings, an output transformer winding 11 and an input transformer winding 13, respectively. The four wires of the line 7 are connected to the terminals of an input transformer winding 15 and an output transformer winding 17, respectively, of each key station 3.

Thereafter line power is fed to the input of a switch-mode power supply unit 9, a unit incorporated in each key station 3, and converted to a regulated d.c. logic level circa 5 volts.

Figure 2:
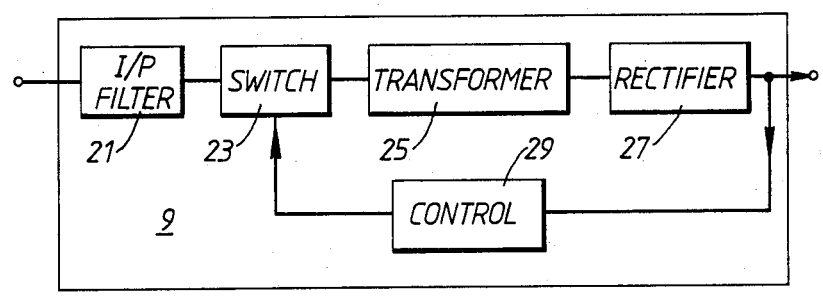
FIG. 2, is a block diagram representing, in generalised form, a switch-mode power supply unit for use in a key station of the system shown in the preceding figure.

A generalised block representation of the switch-mode power supply unit 9 is shown in FIG. 2. This comprises an input filter 21 (optional), a controlled power switch 23, a transformer 25, a rectifier 27, and a switch controller 29. The LT output of the rectifier 27 is monitored by the controller 29, compared with a reference voltage and the switch 23 controlled, accordingly, to regulate the d.c. logic level voltage produced.

In operation, whilst switch 23 is closed, energy is stored in the inductance of the transformer 25. During this phase of operation the rectifier 27 is back-biased. When the switch 23 is subsequently opened and the voltage on the secondary winding of the transformer 25 is reversed, the rectifier 27 is forward biased and passes the energy from the transformer 25 to the output. The high input voltage is reduced by the turns ratio of the transformer 25 and the on/off ratio of the controlled switch 23. The output voltage is compared with a reference voltage in the controller 29 and the on/off ratio controlling signal fed to the switch 23 is regulated as necessary.

Figure 3:
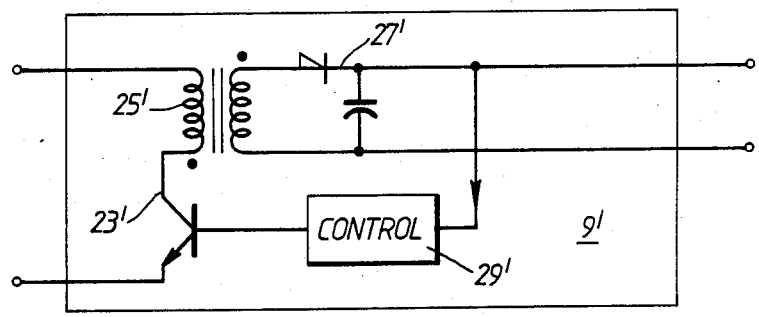
FIG. 3, is a circuit diagram showing a flyback-configuration switch-mode power supply unit, a simple and preferred practical realisation of the unit of FIG. 2 preceding.

A simple practical realisation of the switch-mode power supply unit 9, a flyback configuration 9', is shown in FIG. 3. This comprises a transistor switch 23', a transformer 25', a simple rectifier 27' (comprising a diode and a smoothing capacitor), and a control chip 29'. The latter chip 29' may be an industrial standard component e.g. a LM (CA) 3524 switch-mode power supply controller.

Other configurations of switch-mode power supply unit are not precluded and may be used as an alternative to the aforesaid, e.g. push-pull; forward converter; half-bridge; and, full-bridge configurations, may be utilised. These however are more elaborate and more expensive and attractive therefore only for the highest power applications.

Walsh II code signalling is preferred for this application, though Walsh I and other codes are not altogether precluded from consideration. Walsh I and II coded signal waveforms are shown respectively in FIGS. 4 and 5. In each the binary code number 100 is depicted. In the former WAL I, each digit is represented by a transition midway between opposite logic levels, a Hi-to-Lo transition being assigned to binary "1" and a Lo-to-Hi transition being assigned to binary "0". In the latter, WAL II, each digit is represented by two transitions and has the forms of a wide pulse of one logic level midway between narrow pulses of opposite logic level. The digit "1" is represented by a Hi-Lo-Hi pair of transitions, and digit "0" is represented by a Lo-Hi-Lo pair of transitions. Wide and narrow pulses are of widths in the ratio 2:1. Preferably, burst-mode transmission is used. This provides time synchronisation for decoding purposes.

A WAL II code signal receiver is shown in FIG. 6. This comprises an input transformer 15, a matching termination load 31, an output resistor 33 and diodes 35 and 37. The primary winding of this transformer 15 is the winding already shown in FIG. 1 and has a centre tap connected to one input of the switch-mode power supply unit 9. D.C. isolation is provided between primary and secondary windings. The upper diode 37 is referred to positive potential and thus ties upper excursions of signal to a safe clipped value. The lower diode 35 rejects negative excursion signals. The input Walsh II code signal (distorted) thus produces a unipolar pulse at the circuit output.

A WAL II code signal transmitter is shown in FIG. 7. This comprises an output transformer 17, and controlled switches 41 and 43 connected to the primary winding of this transformer. The impedances of these switches 41, 43 are balanced so that equal but opposite currents can flow along resistor 45 connected to the balanced midpoint of the primary winding. The secondary winding 17, also shown FIG. 1, is tapped and is connected to the other input of the switch-mode power supply unit 9. When complimentary double pulse and single pulse control signals are applied to the switches 41 and 43 respectively, a Walsh code digit signal is produced across the output of the secondary winding.

It is preferable to operate the system using burst mode signalling. Identification of bursts may then be utilised for transmitter/receiver synchronisation. However, continuous data stream operation is not precluded, but signal patterns and pattern recognition techniques must then be adopted for synchronisation and speech-/data signal decoding.

I claim:

1. A telephone key system comprising a central unit and a plurality of key station units, said central unit comprising means to derive an unregulated DC power supply from an AC source and means to connect said DC power supply on transformer phantom pathways to each of said key stations, each of said key stations comprising a switch-mode power supply unit and means to connect said switch-mode power supply unit to said transformer phantom pathways, and circuits of each of said key stations being supplied with regulated DC power derived from said unregulated DC power supply by said switch-mode power supply unit individual thereto.

2. A system as claimed in claim 1 wherein each switch-mode power supply unit comprises a controlled transistor switch; a transformer; a rectifier; and a switch-mode power supply controller, said switch-mode power supply controller being responsive to output of the rectifier to control said controlled transistor switch.

3. A system as claimed in claim 1 wherein said central unit and each of said key stations are interconnected by a two-way four-wire line, said central unit and each of said key stations including centre tapped transformers interconnected by said two-way four-wire line, the centre taps of said transformers providing said transformer phantom pathways.

4. A system as claimed in claim 3, wherein each key station includes a transmitter circuit and a receiver circuit each adapted to communiate with corresponding opposite circuits using WAL II code signalling, the transformers being included one in each of said transmitter and said receiver circuits.

* * * * *